United States Patent
Aldrich et al.

(10) Patent No.: US 6,757,690 B2
(45) Date of Patent: Jun. 29, 2004

(54) METHOD AND SYSTEM FOR MONITORING AND SECURING DATA ACCESS IN A DATABASE SYSTEM

(75) Inventors: Craig S. Aldrich, Rochester, MN (US); Mark John Anderson, Oronoco, MN (US); Kevin Robert Brettin, Rochester, MN (US); Theresa Renee Euler, Oronoco, MN (US); Scott Joseph Heimer, Rochester, MN (US); Steven Virgil Hoeschen, Rochester, MN (US); Ritchie Lee Nyland, Rochester, MN (US); Russ Owen, Rochester, MN (US); Richard Donald Parrott, Rochester, MN (US); Randy Keith Rolfe, Rochester, MN (US); Wayne Christopher Sadecki, Rochester, MN (US); Renee Kristin Saxman, Rochester, MN (US); Kathryn Rose Steinbrink, Chatfield, MN (US); Jonathan Lee Triebenbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 09/817,627

(22) Filed: Mar. 26, 2001

(65) Prior Publication Data

US 2002/0174129 A1 Nov. 21, 2002

(51) Int. Cl.[7] ................................................. G06F 17/00
(52) U.S. Cl. ....................... 707/102; 707/101; 707/103; 707/104; 707/2
(58) Field of Search .......................... 707/101, 2, 103, 707/104, 3, 102; 710/240; 713/200; 717/117; 711/213

(56) References Cited

U.S. PATENT DOCUMENTS

| | | | | | |
|---|---|---|---|---|---|
| 5,457,800 | A | * | 10/1995 | Howells et al. | 710/240 |
| 5,572,673 | A | * | 11/1996 | Shurts | 713/200 |
| 5,680,614 | A | * | 10/1997 | Bakuya et al. | 707/103 |
| 5,682,535 | A | * | 10/1997 | Knudsen | 717/117 |
| 5,809,566 | A | * | 9/1998 | Charney et al. | 711/213 |
| 5,926,819 | A | * | 7/1999 | Doo et al. | 707/104 |
| 6,065,012 | A | * | 5/2000 | Balsara et al. | 707/102 |
| 6,374,236 | B1 | * | 4/2002 | Chen et al. | 707/2 |

FOREIGN PATENT DOCUMENTS

| | | |
|---|---|---|
| EP | 0 811 944 A2 | * 12/1997 |
| WO | WO 00/72563 A1 | * 11/2000 |

* cited by examiner

Primary Examiner—Thuy N. Pardo
(74) Attorney, Agent, or Firm—Moser, Patterson & Sheridan, LLP

(57) ABSTRACT

Methods, systems, data structures and articles of manufacture are provided for monitoring access to a database. In one embodiment, a data access trigger, or read trigger, is adapted to monitor accesses to a database. In general, a data access trigger is invoked when predefined events occur. Specifically, a data access trigger is executed to take some action due to any attempt to access a database. When a specified access attempt is determined, the trigger can instruct the system to take any number of actions, such as modify the data being requested.

In one embodiment, a log is provided in which accesses to the database are recorded. The log may subsequently reviewed to ascertain whether a particular record was accessed and by whom. In addition, the particular information accessed and/or modified can be contained in the log.

27 Claims, 5 Drawing Sheets

METHOD AND SYSTEM FOR MONITORING AND SECURING DATA ACCESS IN A DATABASE SYSTEM

BACKGROUND OF THE INVENTION

1. Field of the Invention

Embodiments of the present invention relate to information processing and more specifically to monitoring access to a database.

2. Background of the Related Art

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns (formally denominated "attributes"). Reference is made to C. J. Date, *An Introduction to Database Systems*, 6th edition, Addison-Wesley Publishing Co. Reading, Mass. (1994) for an comprehensive general treatment of the relational database art.

An RDBMS is structured to accept commands to store, retrieve and delete data using, for example, high-level query languages such as the Structured Query Language (SQL). The term "query" denominates a set of commands for retrieving data from a stored database. The SQL standard has been promulgated by the International Standards Association since 1986.

An important need for entities using databases is the ability to restrict access to confidential or private information. For example, a business may require such restriction as a matter of internally implemented business processes or to comply with government regulations. Typically, access to a database is secured by an authorization list. An authorization list contains those individuals who have access to the files or tables in the database. The granularity of the authorization list may be at the file or table level, or maybe specific to columns of a table. The authorization list may further restrict what operations a user can perform on a table or a specific column in the table. For example, the user may be able to read or view the data, but not change or update the data.

Despite the conventional restriction methods being employed, there exists the possibility that the restricted information could be used improperly by individuals having authorization to access the information. Accordingly, simply securing the data may not provide sufficient control over the access to the data. This is especially true in large corporations or business entities having many divisions and many individuals requiring access to the corporate databases.

Therefore, what is needed is a mechanism to audit, or monitor, which individuals are accessing restricted data, and how often the accesses are occurring. In addition, it may be desirable to monitor trends, such as repeated accesses to a particular database.

SUMMARY OF THE INVENTION

In one embodiment, a data structure contained in a database, comprises a data access trigger definition defined on a table, wherein the data access trigger definition is configured for execution upon detection of an access attempt by a data access entity of at least a portion of one record of the table.

In another embodiment, a method of monitoring access attempts to a table contained within a database is provided. The method comprising receiving, from an entity, a request to access at least a portion of a record of a table having at least one data access trigger defined thereon and executing the at least one data access trigger. The data access trigger is configured to perform a logging process, comprising writing access information to a log.

In another embodiment, a method of monitoring access attempts to a table contained within a database is provided. The method comprising receiving, from an entity, a request to access at least a portion of a record of a table having at least one data access trigger defined thereon and executing the at least one data access trigger. The data access trigger is configured to perform a logging process, comprising writing access information to a log and modifying the information being requested before returning the information to the entity.

In another embodiment, a signal bearing medium containing a program which, when executed by at least one processor, performs a method of monitoring access attempts to a table contained within a database is provided. The method comprising receiving, from an entity, a request to access at least a portion of a record of a table having at least one data access trigger defined thereon and executing the at least one data access trigger. The data access trigger is configured to perform a logging process, comprising writing access information to a log. In another embodiment, the information being requested is modified prior to being returned to the entity.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

Figure 1:
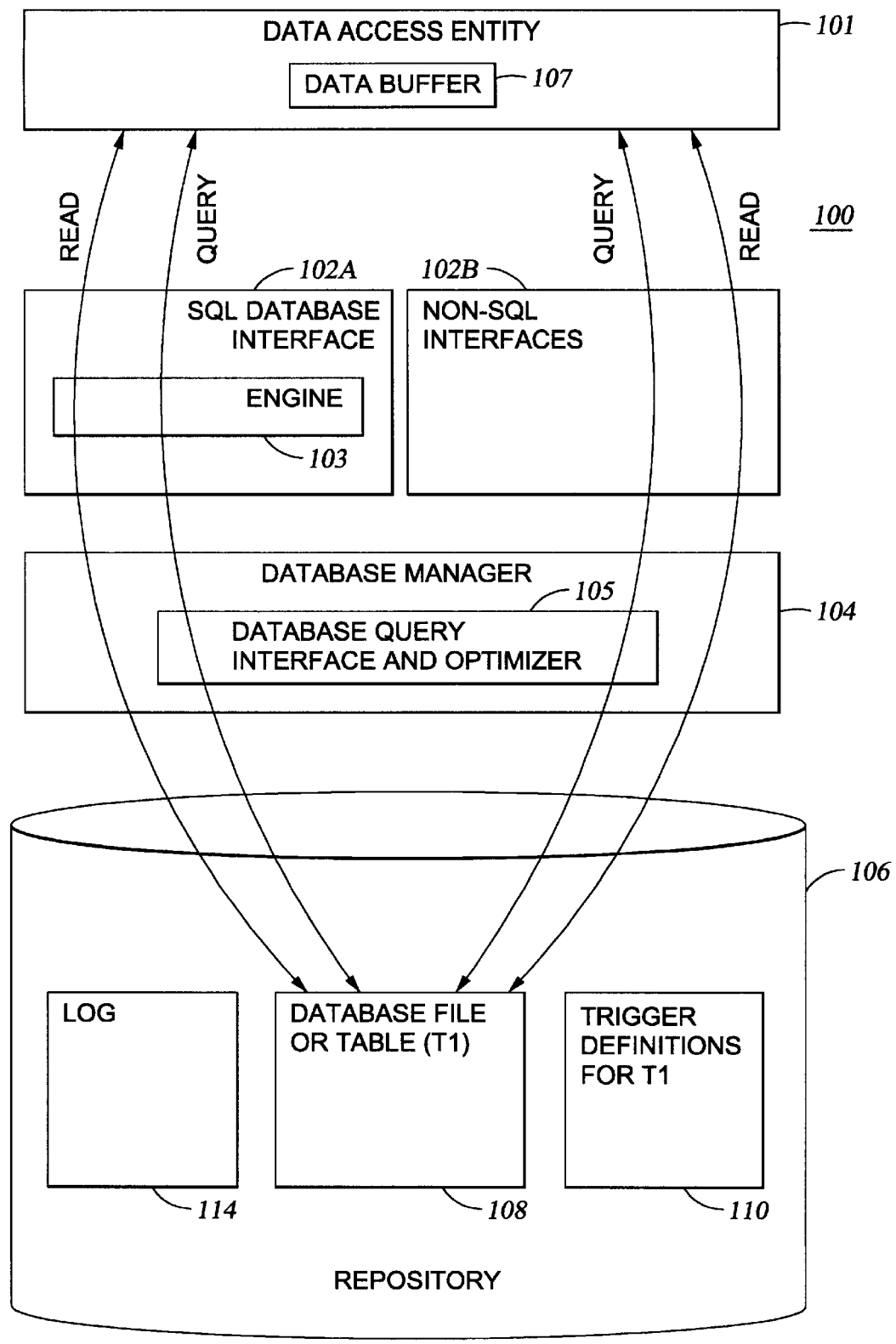
FIG. 1 shows a database management system.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments describe a method, system and article of manufacture for monitoring, and in some cases, restricting, access to a database. To this end, the present application uses triggers to advantage. Triggers are procedures that are defined by managers of the database management system (DBMS). The DBMS invokes triggers when particular events (associated with the triggers) occur. For example, a trigger program may be written to take some action due to an insert, update, or delete operation against a table in a database. In the case of an insert operation, for example, a trigger can be defined such that it is invoked each time a row is inserted into a particular table. A trigger can instruct the system to take any number of actions when a specified change is attempted. Triggers, once defined, cannot be circumvented by application programmers or by end users. As such, triggers help maintain the integrity of the database.

In one embodiment, a trigger is adapted to monitor accesses to a database. For convenience such a trigger is herein referred to as a "data access" trigger or "read" trigger. In general, a data access trigger is a procedure defined by managers/users of the DBMS and is invoked when pre-defined events occur. Specifically, a data access trigger object is executed to take some action due to any attempt to access a database. When a specified access attempt is determined, the trigger can instruct the system to take any number of actions, such as modify the data being accessed.

In one embodiment, a data access trigger is defined to write to a log, whereby accesses to the database are recorded. The log may subsequently be reviewed to ascertain whether a particular database was accessed and, in some cases, by whom. In addition, the particular information accessed and/or modified can be contained in the log.

As will be appreciated, SQL (structured query language) is a well known database language produced by International Business Machines (IBM) Corporation. For illustrative purposes, reference is made to SQL concepts, statements, and syntax. However, embodiments of the invention include all existing database management systems whether they employ SQL or some other database language.

Preferably, the database management system used to advantage is a relational database management system (RDBMS). In particular, the database management system preferably is the well known IBM Database 2 Universal Database (DB2 UDB) produced by International Business Machines (IBM) Corporation. DB2 utilizes the SQL database language for defining and manipulating data in a relational database. However, the present invention is intended and adapted to operate with other types of database management systems, such as relational database management systems other than DB2 which support SQL, relational database management systems which do not support SQL, and non-relational database management systems. In fact, embodiments of the present invention can also be used in non-database operations. The present invention can be used in any applications which employ recoverable resources.

Figure 1A:
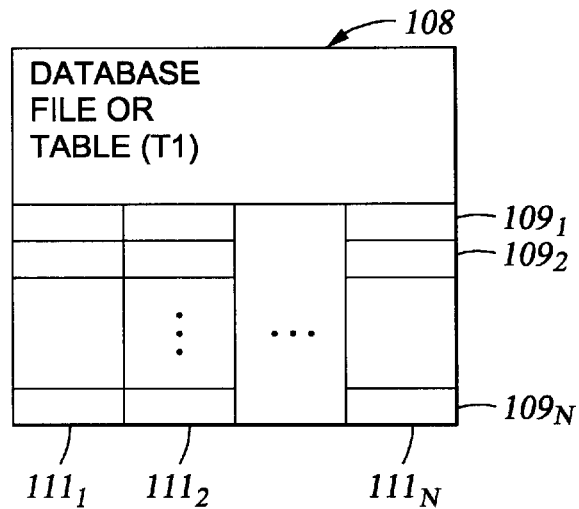
FIG. 1A shows an illustrative data structure for a table.

FIG. 1 shows a high level diagram of a DBMS 100 which may be used to advantage. The DBMS 100 is simplified for brevity, as many aspects of such systems are well known. In general, the DBMS 100 includes a data access entity 101, a plurality of interfaces 102 A–B, a database manager 104, and a repository 106 for permanent objects (e.g., table definitions and trigger information). The repository 106 contains a plurality of tables 108 and trigger definitions $112_1, 112_2, \ldots 112_N$. The tables 108 are stored in the form of data structures containing table definition information. For purposes of brevity and simplicity, only one table, T1, is shown. However, more typically, the DBMS 100 contains a plurality of tables. An illustrative table 108 is shown in FIG. 1A. The table 108 includes a plurality of records $109_1, 109_2, \ldots 109_N$, or rows, and columns $111_1, 111_2, \ldots 111_N$. Each column $111_N$ may contain information of a specified type (e.g., social security number, employee number, address, etc.).

Figure 1B:
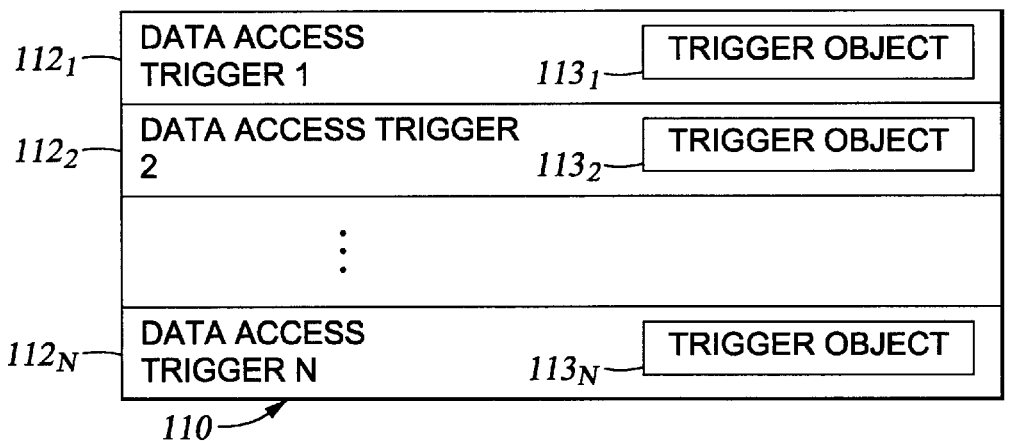
FIG. 1B shows an illustrative data structure containing trigger definitions.

For each table 108, one or more triggers may be defined. As shown in FIG. 1B, triggers are stored in the form of trigger data structures 110 containing trigger definitions 112. The number of triggers definitions 112 for a given table may vary according to a particular implementation. Accordingly, FIG. 1B shows N trigger definitions 112 contained in the trigger data structures 110, where N is some positive integer.

As will be explained in more detail below, each trigger definition 112 defines a data access trigger which is executed upon detection of an attempted access of the tables 108. When a specified access attempt is determined, the data access trigger can instruct the DBMS 100 to take any number of actions. To this end, each trigger definition 112 comprises an trigger object $113_1, 113_2, \ldots 113_N$. Generally, the trigger object 113 is any information that causes the DBMS 100 to take predefined steps upon execution of the trigger 112. The trigger object 113 may be either executable program instructions or may contain SQL statements or other database instructions. In one embodiment, the executable trigger object 113 is a program, such as the C program provided in Table 1 and described below. In another embodiment, the trigger object 113 comprises parsed SQL statements. The latter case illustrates an embodiment in which the executable trigger object 113 is not immediately executable and must first be processed by the SQL engine 103.

The data access entity 101 may be any entity capable of reading information from the repository 106. In particular, data access entity 101 is adapted to issue a request to access tables 108. Results from an access request are returned to a buffer 107 and, in some cases, may then be viewed by a user. Illustratively, the data access entity 101 is a remotely located program (e.g., a computer program executing on a machine connected to a LAN) or is a terminal operated by a human being.

The access requests issued by the data access entity 101 included queries and reads. Typically, a read operation reads a complete record and each record is read in succession. A query, on the other hand, includes selection criteria such that records may potentially be skipped. Accordingly, in the case of a query, it is possible that no records are returned in response to the query. Read operations and queries may be, for example, from a high level query language (e.g., SQL) or from a database management interface.

Accordingly, the interfaces 102 A–B are each configured for different inputs. Specifically, an SQL interface 102A is configured to handle SQL statements while a non-SQL interface 102B represents one or more interfaces for inputs other than SQL inputs. Illustrative non-SQL interfaces include a system application programming interface (API) configured for program described requests and a system command interface is configured for command line inputs. Accordingly, the DBMS 100 may include any number of interfaces.

In general, each of the interfaces 102A–B includes components necessary to handle and process input data. For example, the SQL interface 102A may include an SQL engine 103 configured to build a parse tree from input SQL statements. The parsed statement is then rendered into an executable representation of the SQL statement. When executed, the SQL statement causes an operation (i.e., update, insert or delete) to occur with respect to the data contained in repository 106, according the statement type. Those skilled in the art will recognize that input to the non-SQL interface 102B may be similarly processed to the same end and, therefore, a detailed discussion is not needed.

In operation, the interfaces 102A–B allow communication between the data access entity 101 and the database manager 104. A major goal of the underlying database manager 104 is to provide a suite of mechanisms so that user data (e.g. the tables 108 and trigger definitions 112) can be easily stored and efficiently manipulated. In particular, a query or read can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across multiple tables.

The database manager 104 includes an optimizer 105 to handle SQL queries issued by the data access entity 101. Optimizers are well known and a detailed discussion is not needed. Briefly, the optimizer 105 determines the "cheapest" (i.e., the most efficient or optimal) way to execute each particular query request received from the data access entity 101. The output of the optimization operation is typically referred to as an "execution plan", an "access plan" or simply a "plan". The plan contains low-level information delineating the steps to be taken by the DBMS 100 in executing the query and accessing the data.

Figure 1C:
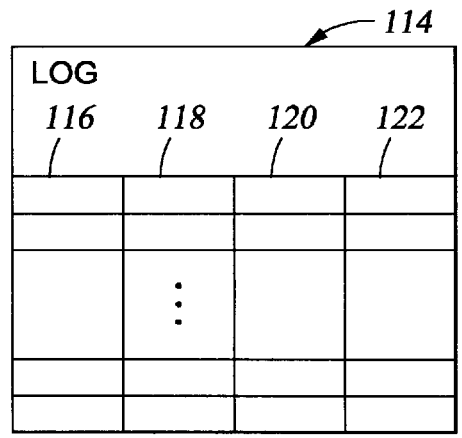
FIG. 1C shows an illustrative data structure for a log.

In one embodiment, the repository 106 includes an access log 114 (herein referred to as the "log") adapted to facilitate monitoring of accesses to the table 108. The log 114 may be any data structure configured to contain access information. In general, access information includes any information related to attempted accesses to the table 108 initiated by the data access entity 101. FIG. 1C shows an illustrative log 114 including a time column 116, a date column 118, a user column 120 and a data column 122. Each column 116–122 may contain a plurality of entries, such that a row of the log 114 provides information for a given access attempt. The time column 116 and the date column 118 indicate the time and date of attempted accesses, respectively. The user column 120 contains information identifying the data access entity 101. For example, an entry of the user column 120 may contain a user ID associated with a particular human operator. The data column 122 contains the data that was accessed (or some reference to the data, e.g. a pointer to the data).

Figure 2:
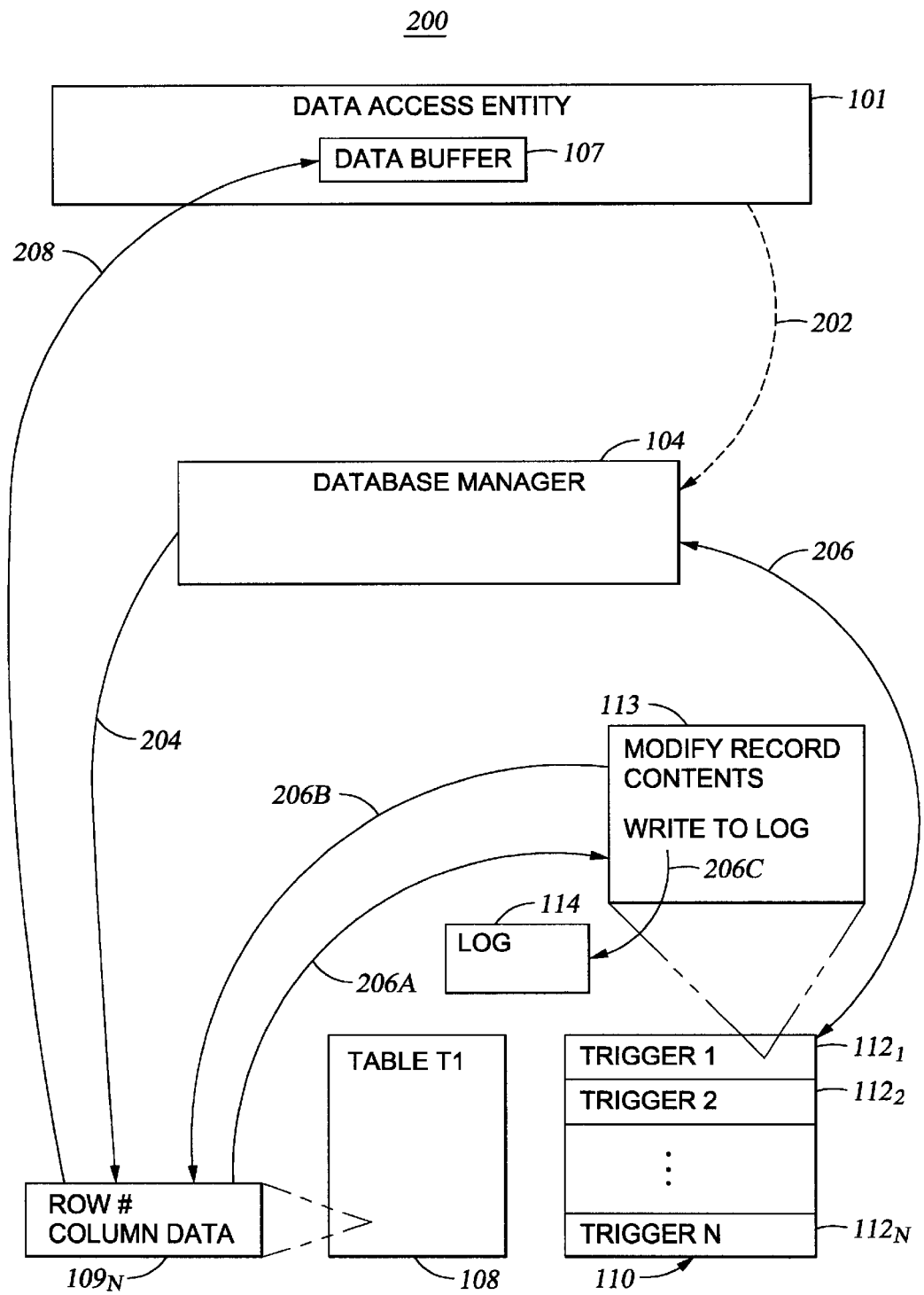
FIG. 2 shows the operation of the database management system shown in FIG. 1.

FIG. 2 shows a data flowchart illustrating a process 200 for the DBMS 100. For brevity and simplicity, some of the aspects of the DBMS shown in FIG. 1 have been removed. Illustratively, the process 200 represents an access request to a table 108 contained in the repository 106 (shown in FIG. 1). The solid lines represent data flow while the perforated lines represent commands. Initially, at step 202, a request is issued from the data access entity 101 to the database manager 104. The request may be any request to access the table 108 in the form of a query or read. The database manager 104 then processes the request and accesses the appropriate table 108 at step 204. In particular, a specific record $109_N$, or row, of the table 108 is read. For purposes of illustration, it is assumed that the table being accessed has a data access trigger 112 defined for it. Accordingly, at step 206 the trigger definition 112 is executed by the database manager 104. Execution includes execution of the associated trigger object 113 at steps 206A–C. For each access attempt more than one trigger may be executed, depending on the trigger definitions 112 contained in the trigger definition data structure 110. Thus, step 206 and associated steps 206A–C are repeated for each trigger defined to execute for the particular access attempt. At step 206A, the record $109_N$ being read is passed to the trigger object 113 which then determines whether the trigger 112 is concerned with or needs to process the data record $109_N$. If so, then at step 206B the contents of the record may be modified to secure the database information. In one embodiment, the action taken by the DBMS 100 to secure the database information in response to an attempted access includes blanking out data, changing data, zeroing out data. In one particular embodiment, a virtual table returned to the data access entity 101 contains a plurality of asterisks where modified data is represented. At step 206C, the trigger object 113 causes the DBMS 100 to write to the log 114. Following the execution of each trigger, results are returned to the buffer 107 at step 208.

Figure 3A:
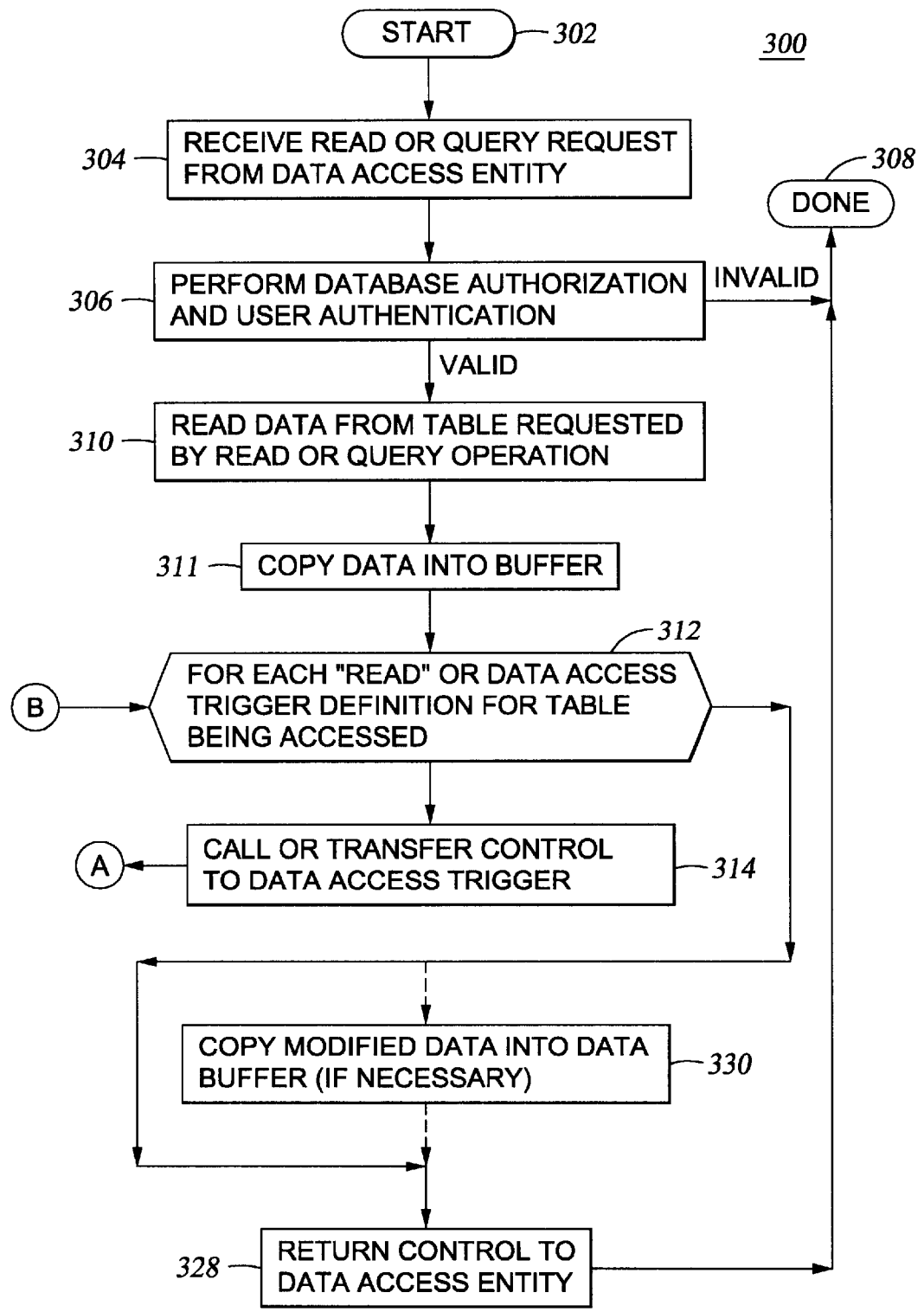
FIG. 3 shows a method for activating data access triggers.
Figure 3B:
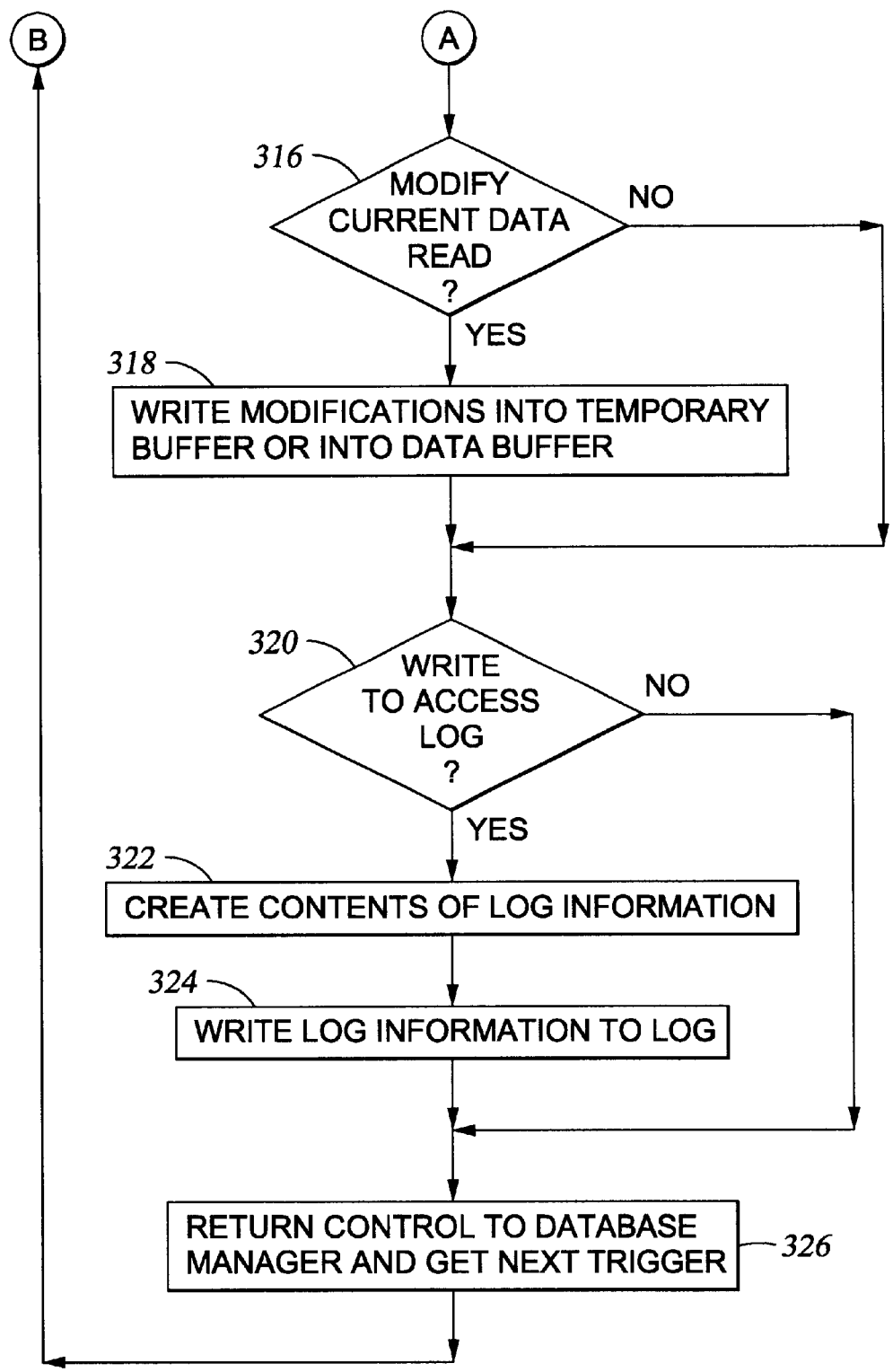

FIG. 3 (collectively comprising FIGS. 3A and 3B) shows a method 300 further detailing the operation of the DBMS 100. Method 300 is entered at step 302 and proceeds to step 304 where an access attempt is received. Illustrative access attempts include read operations, queries and accesses from a logical view of the database object.

At step 306, the method 300 enters an authorization and authentication process. The process of step 306 is an optional process configured to determine whether the data access entity is permitted to access at least some portion of the DBMS 100. If the data access entity fails the authorization and authentication process, the method 300 exits at step 308. If the data access entity passes, the method 300 proceeds to step 310 for further processing of the request.

At step 310, the data requested by the read or query operation received at step 304 is read from the appropriate table. At step 311, the data is written to a buffer. Depending upon a particular implementation, the data may be copied into a temporary buffer or directly into the data buffer 107.

At step 312, an iterative process is begun for each data access trigger contained in the repository 106. At step 314, execution of a data access trigger is initiated by calling or transferring control to the trigger. At step 316, the method 300 queries whether the data requested by the data access entity is to be modified. This determination is made according to external inputs and the trigger definition. For example, the data access trigger may be configured such that, for a particular user identifier and/or a particular data access entity, the requested data is modified. If step 316 is answered affirmatively, the method 300 proceeds to step 318 where the modifications are written into the entity containing the requested data, i.e., the temporary buffer or data buffer 107. The method 300 then proceeds to step 320. If the query at step 316 is answered negatively, the method 300 proceeds directly to step 320.

At step 320, the method queries whether the access request is to be recorded in the access log 114. This determination is made according to external inputs as well as the trigger definition. For example, it may be desirable to record an unscheduled access attempt made from a remotely located personal computer. In contrast, it may be less desirable to record a routine access made for backup purposes. Accordingly, the trigger definition may be configured to write to the access log 114 in the first case, but not in the second.

If step 320 is answered affirmatively, the method 300 proceeds to step 322 where log information is gathered. The gathered log information is written to the log 114 at step 324. Control is then returned to the DBMS 100 at step 326. Control is also returned to the DBMS 100 if the query at step 320 is answered negatively. The method 300 then returns to step 312 to begin processing the next data access trigger defined for the table being accessed.

The iterative process entered at step 312 is repeated for each data access trigger defined for the table being accessed. Once all the data access triggers have been processed, the method 300 proceeds to step 328 to return control to the data access entity. For implementations using a temporary buffer, the method 300 first proceeds to step 330 where the data contained in a temporary buffer is copied into the data buffer 107. From step 330, the method 300 proceeds to step 328 to return control to the data access entity. In either case, the method 300 then exits at step 308.

Embodiments of the present invention are not limited to a particular executable trigger object 113. However, for purposes of illustration, Table 1 shows an exemplary trigger object 113 written in the C programming language. The code in Table 1 is uncompiled. However, it is understood that, in some embodiments, the code contained in a trigger object 113 will be compiled code.

TABLE I

```
001    #include <stdio.h>
002    #include <stdlib.h>
003    #include <string.h>
004    #include "qsysinc/h/trgbuf"
005    #include "EXPECT.H"
006    #include "varhdr.h"
007
008
009    int main (int argc, char *argv [ ] )
010    {
011       Qdb_Trigger_Buffer_t *tbuffp;
012       _Packed struct rec
013       {
014          long col1;
015       } oldrec;
016
017       int oldreco;
018       char *recp;
019       long hv;
020
021       exec sql include sqlca;
022
023       tbuffp = (Qdb_Trigger_Buffer_t *) argv [1];
024       recp = (char *) tbuffp;
025       oldreco = tbuffp->Old_Record_Offset;
026       (void) memcpy (&oldrec, recp+oldreco,
                  tbuffp->Old_Record_Len);
027
028       if (oldrec.col1 = = 2)
029       {
030          exec sql insert into trrdtlib2a.t2 values (trrdtlib2a.jfl (6));
031
032          exec sql call trrdtlib2a.jpl ('sqtrrpgm2a col1=2');
033       }
034       else
035       {
036       }
037
038       return 0;
039    }
```

Lines 001–006 provide the libraries to be included by the compiler at compile time. In particular, the library # include "qsysinc/h/trgbuf" (at line 004) provides an interface describing the definition and location of the record that is being read or accessed and the DBMS structures to access the record. The main function is called at line 009. Lines 023–026 describe how the interface provided at line 004 is used. For example, the definition in the library # include "qsysinc/h/trgbuf " may be copied out of the database row into program storage. Alternatively, the record may be examined via a pointer. At line 028 a specific value is examined to determine whether the trigger is executed upon an access attempt to a given column of the table (for which the trigger is defined). At line 030 the log 114 is written to. The code of Table 1 does not provide for modifying the contents of the table being accessed. However, as described above, other embodiments may so provide.

While the foregoing is directed to the preferred embodiment of the present invention, other and further embodiments of the invention may be devised without departing from the basic scope thereof, and the scope thereof is determined by the claims that follow.

What is claimed is:

1. A data structure contained in a database, comprising a data access trigger definition defined on a table, wherein the data access trigger definition is configured for execution upon detection of an access attempt by a data access entity of at least a portion of one record of the table, wherein the access attempt is a request to read the portion of the one record and return a copy of the portion to a requesting entity initiating the access attempt, and the data access trigger definition is configured to cause to a database manager to log the access attempt.

2. The data structure of claim 1, wherein the data access trigger definition is configured to selectively modify the copy of the portion of the record prior to returning the copy to the data access entity.

3. The data structure of claim 2, wherein the copy is selectively modified according to external inputs selected from at least one of the data access entity and an information type of the portion of the one record.

4. The data structure of claim 1, wherein the data access trigger definition is configured to cause a database manager to record the portion of the record, an entity identifier, a time value indicating the time of the access attempt, and a data value indicating the date of the access attempt.

5. The data structure of claim 1, wherein the data access trigger definition is configured to cause a database manager to record the portion of the record and an entity identifier.

6. The data structure of claim 1, wherein the data access trigger definition is configured to cause a database manager to log the access attempt and is further configured to selectively modify the copy of the portion of the record prior to returning the copy to the data access entity.

7. The date structure of claim 1, wherein the trigger definition is contained on a signal bearing medium.

8. The data structure of claim 1, wherein the data access trigger definition comprises a trigger object configured to be executed upon detection of the access attempt.

9. The data structure of claim 8, wherein the trigger object comprises at least one of an executable program and an SQL statement.

10. The data structure of claim 1, wherein the access attempt does not manipulate data contained in the table.

11. A method of monitoring access attempts to a table contained within a database, wherein access attempts are requests to return data, the method comprising:
(a) receiving, from an entity, a request to access and return to the entity at least a portion of a record of a table having at least one data access trigger defined thereon; and
(b) executing the at least one data access trigger, wherein the data access trigger is configured to perform a logging process, comprising writing access information to a log.

12. The method of claim 11, wherein writing access information to the log comprises writing at least an entity identifier indicating the entity.

13. The method of claim 11, further comprising, prior to (a), determining whether the record is accessible to the entity.

14. The method of claim 11, wherein the request is one of an SQL operation and a non-SQL request.

15. The method of claim 11, wherein the request is one of a read and a query.

16. The method of claim 11, wherein the access information further comprises at least a part of the portion of the record.

17. The method of claim 11, wherein the logging process further comprises modifying the portion of the record before returning the portion of the record to the entity.

18. The method of claim 17, wherein the logging process and the modifying is performed if the data access trigger is defined for at least one of the entity and a type of information contained in the portion of the record.

19. The method of claim 16, wherein writing access information to the log comprises writing at least an entity identifier indicating the entity.

20. A signal bearing medium containing a program which, when executed by at least one processor, performs a method of monitoring access attempts to a table contained within a database, wherein access attempts are requests to return data, the method comprising:

(a) receiving, from an entity, a request to access and return to the entity at least a portion of a record of a table having at least one data access trigger defined thereon; and (b) executing the at least one data access trigger, wherein the data access trigger is configured to perform a logging process, comprising writing access information to a log.

21. The signal bearing medium of claim 20, wherein writing access information to the log comprises writing at least an entity identifier indicating the entity.

22. The signal bearing medium of claim 20, further comprising, prior to (a), determining whether the record is accessible to the entity.

23. The signal beating medium of claim 20, wherein the request is one of an SQL operation and a non-SQL request.

24. The signal bearing medium of claim 20, wherein the request is one of a read and a query.

25. The signal bearing medium of claim 20, wherein the access information further comprises at least a pad of the portion of the record.

26. The signal bearing medium of claim 20, wherein the logging process further comprises modifying the portion of the record before returning the portion of the record to the entity.

27. The signal bearing medium of claim 26, wherein the logging process and the modifying is performed if the data access trigger is defined for at least one of the entity and a type of information contained in the portion of the record.

* * * * *